United States Patent
Takada et al.

(10) Patent No.: US 7,524,585 B2
(45) Date of Patent: Apr. 28, 2009

(54) ANODE AND BATTERY USING IT

(75) Inventors: Tomoo Takada, Fukushima (JP);
Kenichi Kawase, Fukushima (JP);
Isamu Konishiike, Fukushima (JP);
Yukiko Iijima, Fukushima (JP); Yukio Miyaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 494 days.

(21) Appl. No.: 10/884,734

(22) Filed: Jul. 2, 2004

(65) Prior Publication Data
US 2005/0014068 A1    Jan. 20, 2005

(30) Foreign Application Priority Data
Jul. 15, 2003   (JP) ............................. 2003-274860

(51) Int. Cl.
*H01M 4/40* (2006.01)
*H01M 4/64* (2006.01)
*B32B 15/01* (2006.01)

(52) U.S. Cl. .................. 429/231.95; 429/245; 428/635; 428/646

(58) Field of Classification Search ............. 429/218.1, 429/231.1, 231.95, 245; 428/635, 646

See application file for complete search history.

(56) References Cited

U.S. PATENT DOCUMENTS

| | | | | |
|---|---|---|---|---|
| 3,314,771 | A * | 4/1967 | Hoffmann et al. ........... | 428/635 |
| 3,534,459 | A * | 10/1970 | Kudo et al. .................. | 428/646 |
| 6,136,460 | A * | 10/2000 | Chen et al. .............. | 428/646 X |
| 6,413,284 | B1 * | 7/2002 | Chu et al. ............. | 429/218.1 X |
| 6,537,701 | B1 * | 3/2003 | Nimon et al. .......... | 429/231.95 |
| 6,890,685 | B2 * | 5/2005 | Yamamoto et al. .. | 429/231.95 X |
| 6,916,581 | B2 * | 7/2005 | Tamura et al. ......... | 429/231.95 |
| 7,132,197 | B2 * | 11/2006 | Miyaki ..................... | 429/218.1 |
| 2004/0265698 | A1* | 12/2004 | Takada et al. ........... | 429/245 X |

* cited by examiner

*Primary Examiner*—Stephen J. Kalafut
(74) *Attorney, Agent, or Firm*—Robert J. Depke; Rockey, Depke & Lyons, LLC.

(57) ABSTRACT

The invention provides an anode capable of inhibiting collapse of a shape of an anode active material layer and a side reaction with an electrolyte in accordance with the collapse, and inhibiting reduction in a battery capacity, and a battery using it. The anode comprises an anode current collector and the anode active material layer. The anode active material layer has a first layer containing Sn and a second layer containing an element other than Sn capable of electrochemically inserting and extracting Li. A component element of the anode current collector is preferably diffused in both the first layer and the second layer.

21 Claims, 4 Drawing Sheets

ANODE AND BATTERY USING IT

The present application claims priority to Japanese Patent Application JP2003-274860, filed in the Japanese Patent Office Jul.15, 2003; the entire contents of which is incorporated herein by reference.

BACKGROUND OF THE INVENTION

1. Field of the Invention

The present invention relates to an anode having an anode current collector and an anode active material layer, and a battery using it.

2. Description of the Related Art

In recent years, in connection with high-performance and multi-function of mobile devices, high capacities of secondary batteries, the power source for the mobile devices have been desired earnestly. As a secondary battery which meets this demand, there is a lithium secondary battery. However, in the case of using cobalt acid lithium for a cathode and graphite for an anode, which is currently a typical form for lithium secondary batteries, the battery capacity is in a saturated state, and it is extremely difficult to greatly obtain a high capacity of the battery. Therefore, from old times, using metal lithium (Li) for an anode has been considered. However, in order to put the anode to practical use, it is necessary to improve efficiency of precipitation dissolution of lithium and to control dendrite precipitation form.

Meanwhile, a high capacity anode using silicon (Si), tin (Sn) or the like has been actively considered. However, when charge and discharge are repeated, shapes of these anodes are collapsed due to significant expansion and shrinkage of an anode active material, current collecting characteristics are lowered, and dissolution reaction of an electrolyte is promoted due to an increased superficial area, so that their cycle characteristics are extremely poor. Therefore, an anode wherein an anode active material layer is formed on an anode current collector by vapor-phase deposition method, liquid-phase deposition method, sintering method or the like has been considered (for example, refer to Japanese Unexamined Patent Application Publication No. H08-50922, Japanese Patent Publication No. 2948205, and Japanese Unexamined Patent Application Publication No. H11-135115). Specially, an anode wherein this anode is further provided with heat treatment to alloy at least on a part of an interface between the anode active material layer and the anode current collector has attracted attention as an anode providing high characteristics. According to this anode, since miniaturization can be inhibited compared to conventional coating type anodes wherein slurry containing a particulate anode active material, a binder and the like are applied, and the anode current collector and the anode active material layer can be integrated, electronic conduction in the anode becomes extremely excellent, and high performance in terms of capacity and cycle life is expected. In addition, a conductive agent, a binder, voids and the like which have existed in the anode conventionally can be reduced or excluded. Therefore, the anode can become a thin film essentially.

However, even when using this anode, there has been a problem that a shape of the anode active material layer is collapsed due to charge and discharge, a side reaction with the electrolyte in accordance with the collapse is raised, and the battery capacity is reduced as charge and discharge are repeated.

SUMMARY OF THE INVENTION

The invention has been achieved in consideration of such problems, and it is an object of the invention to provide an anode capable of inhibiting collapse of a shape of an anode active material layer, a side reaction with an electrolyte in accordance with the collapse, and reduction in a battery capacity, and a battery using it.

A first anode according to the invention comprises an anode current collector and an anode active material layer which is provided on the anode current collector, wherein the anode active material layer contains tin and an element other than tin, which is capable of electrochemically inserting and extracting lithium, and their concentrations are continuously or intermittently changed in the thickness direction.

A second anode according to the invention comprises an anode current collector and an anode active material layer which is provided on the anode current collector, wherein the anode active material layer has a first layer containing tin and a second layer containing an element other than tin, which is capable of electrochemically inserting and extracting lithium.

A first battery according to the invention comprises a cathode, an anode, and an electrolyte, wherein the anode comprises an anode current collector and an anode active material layer which is provided on the anode current collector, and the anode active material layer contains tin and an element other than tin, which is capable of electrochemically inserting and extracting lithium, and their concentrations are continuously or intermittently changed in the thickness direction.

A second battery according to the invention comprises a cathode, an anode and an electrolyte, wherein the anode comprises an anode current collector and an anode active material layer which is provided on the anode current collector, and the anode active material layer has a first layer containing tin and a second layer containing an element other than tin, which is capable of electrochemically inserting and extracting lithium.

According to the first anode of the invention, the anode active material layer contains tin and an element other than tin, which is capable of electrochemically inserting and extracting lithium, and their concentrations are continuously or intermittently changed in the thickness direction. According to the second anode of the invention, in addition to the first layer containing tin, the second layer containing an element other than tin, which is capable of electrochemically inserting and extracting lithium is provided. Therefore, collapse of a shape of the anode active material layer due to charge and discharge and a side reaction with the electrolyte in accordance with the collapse can be inhibited.

Further, according to the first battery of the invention, the first anode of the invention is used. Furthermore, according to the second battery of the invention, the second anode of the invention is used. Therefore, reduction in the battery capacity can be inhibited.

In particular, when the second layer contains a metal element other than tin, which is capable of electrochemically inserting and extracting lithium, and which has a lower melting point than that of the anode current collector by 600° C. or over; or when a component element of the anode current collector is diffused in both the first layer and the second layer; or when the second layer is formed so that its thickness is from 1% to 120% in relation to a thickness of the first layer, and then provided with heat treatment, characteristics can be still improved.

Other and further objects, features and advantages of the invention will appear more fully from the following description.

DETAILED DESCRIPTION OF THE PREFERRED EMBODIMENT

An embodiment of the invention will be described in detail hereinafter with reference to the drawings.

Figure 1:
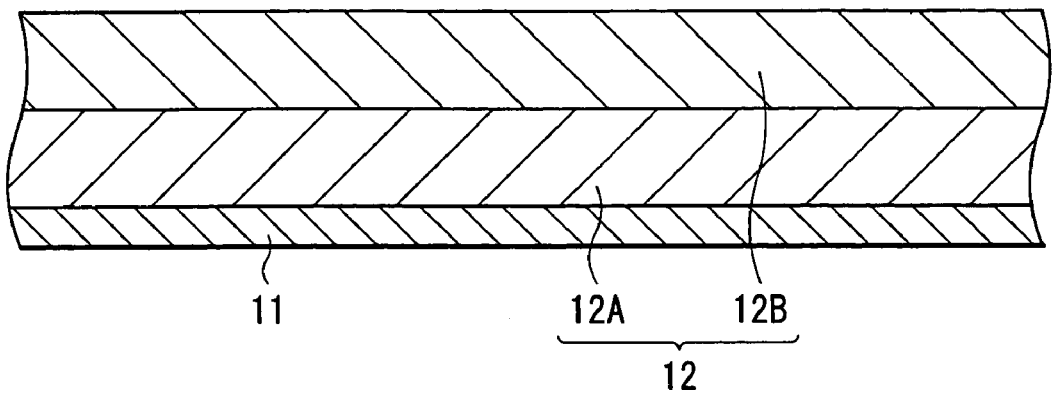
FIG. 1 is a cross sectional view showing a construction of an anode according to an embodiment of the invention.

FIG. 1 shows a schematic construction of an anode according to the embodiment of the invention. This anode has a structure, for example, wherein an anode active material layer 12 is provided on an anode current collector 11. As a component material for the anode current collector 11, for example, copper (Cu), iron (Fe), nickel (Ni), titanium (Ti), tungsten (W), molybdenum (Mo), stainless, or a metal material containing at least one of the foregoing materials, which has a low reactivity to lithium is preferable. When using a metal having a high reactivity to lithium, expansion and shrinkage would be raised in accordance with charge and discharge, and destruction of the anode current collector 11 would be raised. Specially, in view of the price and processability, copper (Cu), iron (Fe), nickel (Ni), titanium (Ti), or stainless is preferable. It is more preferable that the component material for the anode current collector 11 contains an element easily to alloy with the anode active material layer 12. The anode current collector 11 can be constructed by a monolayer, or by several layers. When the anode current collector 11 is constructed by several layers, it is possible that a layer contacting with the anode active material layer 12 is made of a metal material easy to alloy with the anode active material layer 12, and other layers are made of other metal materials.

The anode active material layer 12 has a first layer 12A containing tin and a second layer 12B containing an element other than tin capable of electrochemically inserting and extracting lithium (hereinafter referred to as an/the element other than tin), which are sequentially layered from the anode current collector 11 side.

The first layer 12A specifically contains one or more of a simple substance, alloys, and compounds of tin as an anode active material. Therefore, a secondary battery using this anode can provide a high capacity. Examples of the alloys or compounds of tin include an alloy of tin and an element in Groups 4 to 11 in the long period type periodic table. In addition, $Mg_2Sn$, $SnO_w$ ($0<w\leq2$), $SnSiO_3$, and $LiSnO$ can be cited.

The first layer 12A can contain an element incapable of electrochemically inserting and extracting lithium such as cobalt (Co) in addition to tin. This element can be contained as a simple substance, an alloy, or a compound. However, the content of the element is less than that of tin.

The second layer 12B specifically contains one or more of simple substances, alloys, and compounds of elements other than tin as an anode active material. Therefore, even the anode has the first layer 12A whose volume is significantly changed based on charge and discharge, due to existence of the second layer 12B having an expansion rate different from that of the first layer 12A, stress on the anode current collector 11 due to expansion and shrinkage can be reduced, collapse of a shape of the anode active material layer 12 can be inhibited, and a side reaction between the anode active material layer 12 and an electrolyte can be inhibited.

The second layer 12B is preferably alloyed with the first layer 12A at least on a part of an interface therebetween by, for example, heat treatment. That is, it is preferable that a component element of the second layer 12B is diffused in the first layer 12A, or a component element of the first layer 12A is diffused in the second layer 12B, or the both component elements are diffused each other on the interface therebetween. In particular, it is more preferable that the content of the element other than tin in the second layer 12B on the other side of the first layer 12A side is more than that on the first layer 12A. The reason thereof is that collapse of a shape of the anode active material layer 12 can be more inhibited due to such construction. In this specification, the foregoing diffusion of the elements is regarded as one alloying mode.

As an element other than tin, a metal element having a lower melting point than that of the anode current collector 11 by 400° C. or over is preferable. A metal element having a lower melting point than that of the anode current collector 11 by 600° C. or over is more preferable. For example, when the anode current collector 11 is made of the foregoing material, zinc (Zn), cadmium (Cd), indium (In) or lead (Pb) is preferable as an element other than tin. The reason thereof is that in heat treatment, deformation, plasmotomy or the like of the anode current collector 11 can be avoided, such elements can be quickly diffused in the first layer 12A by heat treatment, and the second layer 12B and the first layer 12A can be easily alloyed. Examples of alloys or compounds of elements other than tin include alloys or oxides comprised of each element of zinc, cadmium, indium, and lead and an element in Groups 4 to 11 in the long period type periodic table.

The second layer 12B can contain an element incapable of electrochemically inserting and extracting lithium in addition to the foregoing element other than tin. This element can be contained as a simple substance, an alloy, or a compound. However, the content of this element is relatively less than that of tin.

Figure 2:
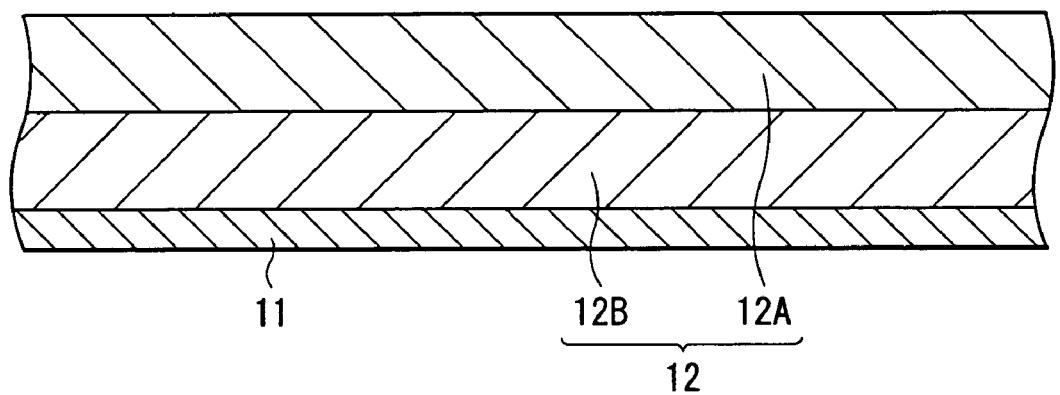
FIG. 2 is a cross sectional view showing other construction of the anode according to the embodiment of the invention.
Figure 3:
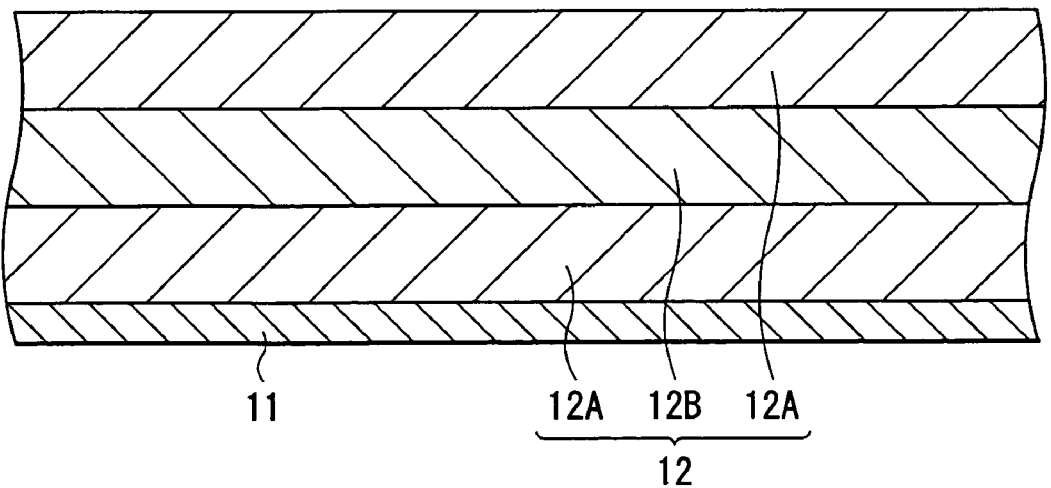
FIG. 3 is a cross sectional view showing other construction of the anode according to the embodiment of the invention.

As shown in FIG. 2, for example, the first layer 12A and the second layer 12B can be layered in the order of firstly the second layer 12B and secondly the first layer 12A from the anode current collector 11 side. In addition, number of layers of the first layer 12A and the second layer 12B is not limited to one respectively. For example, as shown in FIG. 3, they can be layered in the order of firstly the first layer 12A, secondly the second layer 12B, and thirdly the first layer 12A from the anode current collector 11 side.

The anode active material layer 12 having such a construction is preferably alloyed with the anode current collector 11 at least on a part of an interface with the anode current collector 11. That is, when the anode current collector 11 contacts with the first layer 12A, it is preferable that a component element of the anode current collector 11 is diffused in the first layer 12A, or a component element of the first layer 12A is diffused in the anode current collector 11, or the both component elements are diffused each other on the interface therebetween. When the anode current collector 11 contacts with the second layer 12B, it is preferable that a component element of the anode current collector 11 is diffused in the second layer 12B, or a component element of the second layer 12B is diffused in the anode current collector 11, or the both component elements are diffused each other on the interface therebetween. The reason thereof is that integration of the anode current collector 11 and the anode active material layer 12 is promoted in accordance with diffusion of the component element of the anode current collector 11, and collapse of the shape can be inhibited. In addition, it is preferable that respective component elements of the anode current collector 11, the first layer 12A, and the second layer 12B are diffused in the respective adjacent layers.

The anode active material layer 12, that is, the first layer 12A and the second layer 12B are preferably formed by at least one method from the group consisting of vapor-phase deposition method, liquid-phase deposition method, and sintering method. The reason thereof is that collapse of the shape due to expansion and shrinkage of the anode active material layer 12 in accordance with charge and discharge can be inhibited, the anode current collector 11 and the anode active material layer 12 can be integrated, and electronic conductivity in the anode can be improved. In addition, differently from the conventional coating type anode, a binder, voids or the like can be reduced or excluded, and a thin film can be obtained.

The anode can be manufactured as follows, for example. Descriptions will be hereinafter given of a case to manufacture the anode shown in FIG. 1 mainly.

First, for example, the anode current collector 11 is prepared, and the first layer 12A is formed on the anode current collector 11. The first layer 12A can be formed by depositing one or more of a simple substance, alloys, and compounds of tin by using vapor-phase deposition method or liquid-phase deposition method. Otherwise, the first layer 12A can be formed by sintering method wherein a layer containing one or more of particulate simple substance, alloys, and compounds of tin is formed on the anode current collector 11, and then the resultant is sintered. Otherwise, the first layer 12A can be formed by combining two or more methods of vapor-phase deposition method, liquid-phase deposition method, and sintering method.

Next, the second layer 12B is formed on the first layer 12A. The second layer 12B can be formed by depositing on the first layer 12A one or more of simple substances, alloys, and compounds of elements other than tin by using vapor-phase deposition method or liquid-phase deposition method. Otherwise, the second layer 12B can be formed by sintering method wherein a layer containing one or more of particulate simple substances, alloys, and compounds of elements other tin is formed on the first layer 12A, and then the resultant is sintered. Otherwise, the second layer 12B can be formed by combining two or more methods of vapor-phase deposition method, liquid-phase deposition method, and sintering method.

In this regard, it is preferable to form the second layer 12B having a thickness of 1% or more in relation to a thickness of the first layer 12A. The reason thereof is that collapse of the shape in accordance with expansion and shrinkage of the anode active material layer 12 can be inhibited. In addition, it is preferable to form the second layer 12B having a thickness of 120% or less in relation to a thickness of the first layer 12A in order to realize a high capacity and reduction in load from the used element to the environment. Here, descriptions are given of a case wherein one first layer 12A and one second layer 12B are respectively provided. In the case that there are a plurality of first layers 12A and the second layers 12B, a thickness of the first layer 12A means the total thickness of the plurality of first layers 12A, and a thickness of the second layer 12B means the total thickness of the plurality of second layers 12B.

As vapor-phase deposition method used in forming the first layer 12A and the second layer 12B, physical deposition method or chemical deposition method is used. Specifically, vacuum deposition method, spattering method, ion plating method, laser ablation method, thermal CVD (Chemical Vapor Deposition) method, plasma CVD method or the like can be used. As liquid-phase deposition method, electrolytic plating method, electroless plating method or the like can be used. Regarding sintering method, known techniques can be used. For example, atmosphere sintering method, reaction sintering method, or hot press sintering method can be used.

After forming the second layer 12B, the anode current collector 11 on which the first layer 12A and the second layer 12B are formed is provided with heat treatment in, for example, vacuum atmosphere, air atmosphere, reduction atmosphere, oxidization atmosphere, or inert atmosphere. The anode active material layer 12 is thereby alloyed with the anode current collector 11 at least on a part of an interface between the anode active material layer 12 and the anode current collector 11. In order to avoid deformation and plasmotomy of the anode current collector 11, the heat treatment temperature is preferably low.

In some cases, the anode active material layer 12 is alloyed with the anode current collector 11 at least on a part of the interface with the anode current collector 11 by forming the first layer 12A and the second layer 12B by using at least one method from the group consisting of vapor-phase deposition method, liquid-phase deposition method, and sintering method. In this case, it is not necessary to provide heat treatment. However, even in this case, providing heat treatment is preferable since characteristics may be improved by further developing alloying.

This anode is used for a secondary battery as follows, for example.

Figure 4:
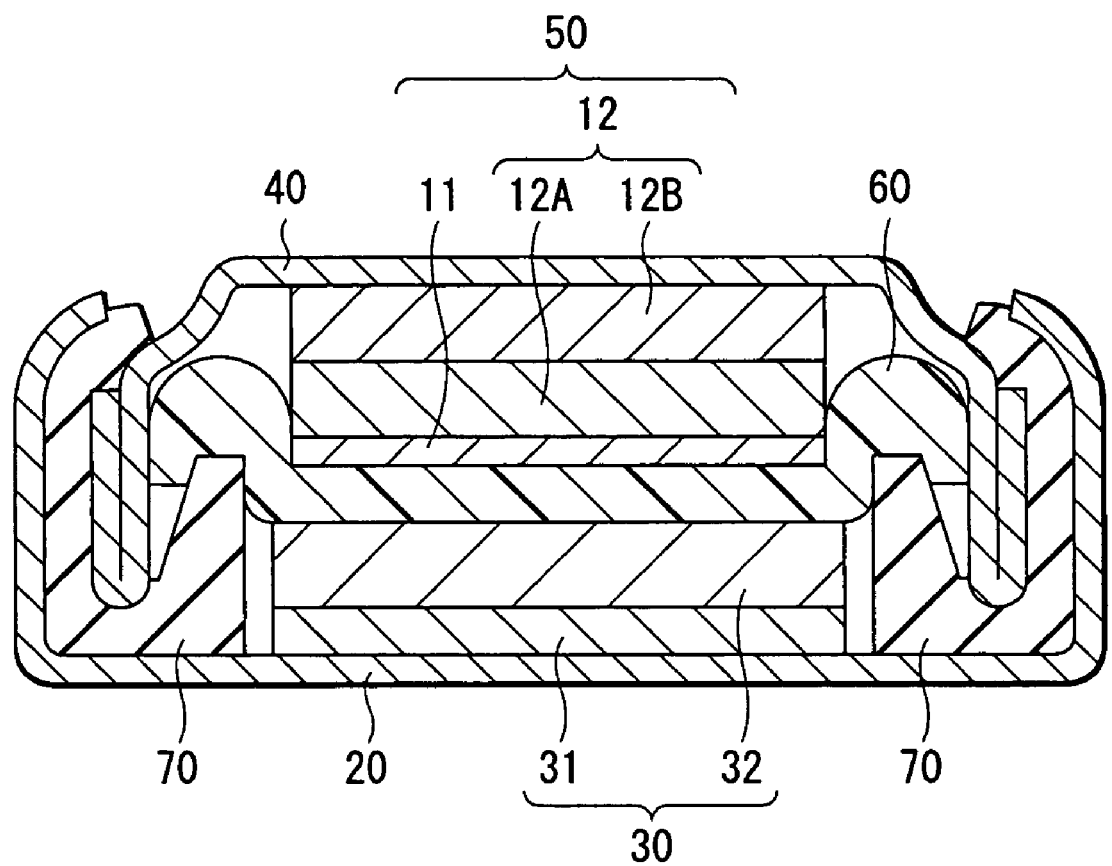
FIG. 4 is a cross sectional view showing a construction of a secondary battery using the anode shown in FIG. 1.

FIG. 4 shows a construction of the secondary battery. This secondary battery is a so-called coin type secondary battery. A disc-shaped cathode 30 housed in an exterior can 20 and a disc-shaped anode 50 according to this embodiment housed in an exterior cup 40 are layered with a separator 60 in between. Peripheral edges of the exterior can 20 and the exterior cup 40 are hermetically closed by caulking through insulating gaskets 70. The exterior can 20 and the exterior cup 40 are made of, for example, a metal such as stainless and aluminum (Al), respectively. In FIG. 4, the anode shown in FIG. 1 is shown as an example of the anode 50.

The cathode 30 comprises, for example, a cathode current collector 31 and a cathode active material layer 32 provided on the cathode current collector 31. The cathode current collector 31 is made of, for example, aluminum, nickel, stainless or the like.

The cathode active material layer 32 contains, for example, one or more of cathode materials capable of inserting and extracting lithium as a cathode active material. The cathode active material layer 32 can also contain a conductive agent such as a carbon material and a binder such as polyvinylidene fluoride if necessary. As a cathode material capable of inserting and extracting lithium, for example, a lithium-containing metal complex oxide expressed by a general formula of $Li_x MIO_2$ is preferable, because a high capacity can be obtained. MI represents one or more transition metals, and preferably at least one from the group consisting of cobalt, nickel, and manganese. x differs depending on a charge and discharge state of the battery, and is generally in the range of $0.05 \leq x \leq 1.10$. Concrete examples of the lithium-containing metal complex oxide include $LiCoO_2$ and $LiNiO_2$.

This cathode 30 can be fabricated, for example, by forming the cathode active material layer 32 on the cathode current collector 31 by using coating method wherein a mixture containing a binder in addition to the cathode active material is applied.

The separator 60 is intended to separate the cathode 30 from the anode 50, prevent current short circuit due to contact therebetween, and let through lithium ions. The separator 60 is made of, for example, polyethylene or polypropylene.

An electrolytic solution, which is a liquid electrolyte is impregnated in the separator 60. This electrolytic solution contains, for example, a solvent and a lithium salt, an electrolyte salt dissolved in this solvent. The electrolytic solution can also contain various additives if necessary. Using the electrolytic solution as above is preferable, since a high ion conductivity can be obtained. Examples of the solvent include organic solvents such as ethylene carbonate, propylene carbonate, dimethyl carbonate, diethyl carbonate, and ethyl methyl carbonate. One solvent or a mixture of two or more solvents can be used.

Examples of the lithium salt include $LiPF_6$ and $LiClO_4$. One lithium salt or a mixture of two or more lithium salts can be used.

This secondary battery can be manufactured by, for example, layering the cathode 30, the separator 60 in which an electrolytic solution is impregnated, and the anode 50, inserting the layered body in the exterior can 20 and the exterior cup 40, and providing caulking.

In this secondary battery, when charged, for example, lithium ions are extracted from the cathode 30, and are inserted in the anode 50 through the electrolytic solution. When discharged, for example, lithium ions are extracted from the anode 50, and are inserted in the cathode 30 through the electrolytic solution. In this regard, since the anode 50 has the second layer 12B in addition to the first layer 12A, collapse of the shape of the anode active material layer 12 is inhibited, and side reaction with the electrolytic solution is inhibited. Therefore, reduction in a battery capacity due to repeat of charge and discharge is inhibited.

The anode according to this embodiment can be used for a secondary battery as follows.

Figure 5:
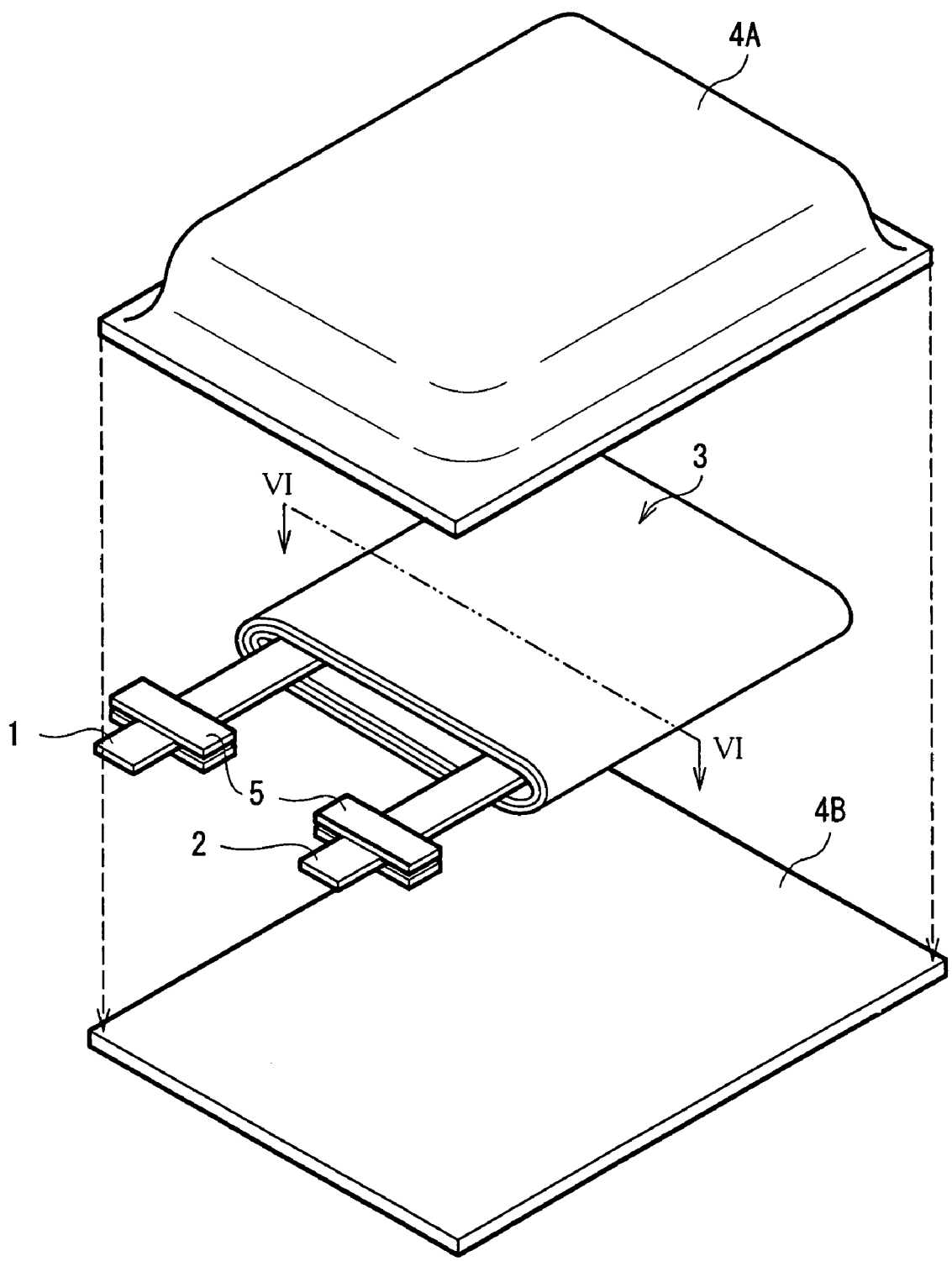
FIG. 5 is an oblique perspective view showing a construction of other secondary battery using the anode shown in FIG. 1.

FIG. 5 shows an exploded view of the secondary battery. This secondary battery is a secondary battery wherein an electrode winding body 3 to which a cathode lead 1 and an anode lead 2 are attached is housed inside film exterior members 4A and 4B, and its size, weight and thickness can be reduced.

The cathode lead 1 and the anode lead 2 are directed from inside of the exterior members 4A and 4B to outside thereof, and, for example, are derived in the same direction. The cathode lead 1 and the anode lead 2 are respectively made of a metal material such as aluminum, copper, nickel, and stainless, and are respectively in the shape of a thin plate or in the shape of a net.

The exterior members 4A and 4B are made of rectangular aluminum laminated films, wherein, for example, a nylon film, an aluminum foil, and a polyethylene film are bonded together in this order. The exterior members 4A and 4B are, for example, arranged so that a polyethylene film side and the electrode winding body 3 are placed opposite, and respective outer edge parts are adhered to each other by fusion bonding or an adhesive. Adhesive films 5 to protect from outside air intrusion are inserted between the exterior members 4A, 4B, and the cathode lead 1, the anode lead 2. The adhesive films 5 are made of a material having contact characteristics to the cathode lead 1 and the anode lead 2, for example a polyolefin resin such as polyethylene, polypropylene, modified polyethylene, and modified polypropylene.

The exterior members 4A and 4B can be made of laminated films having other structures, high molecular weight films such as polypropylene, or metal films, instead of the foregoing aluminum laminated film.

Figure 6:
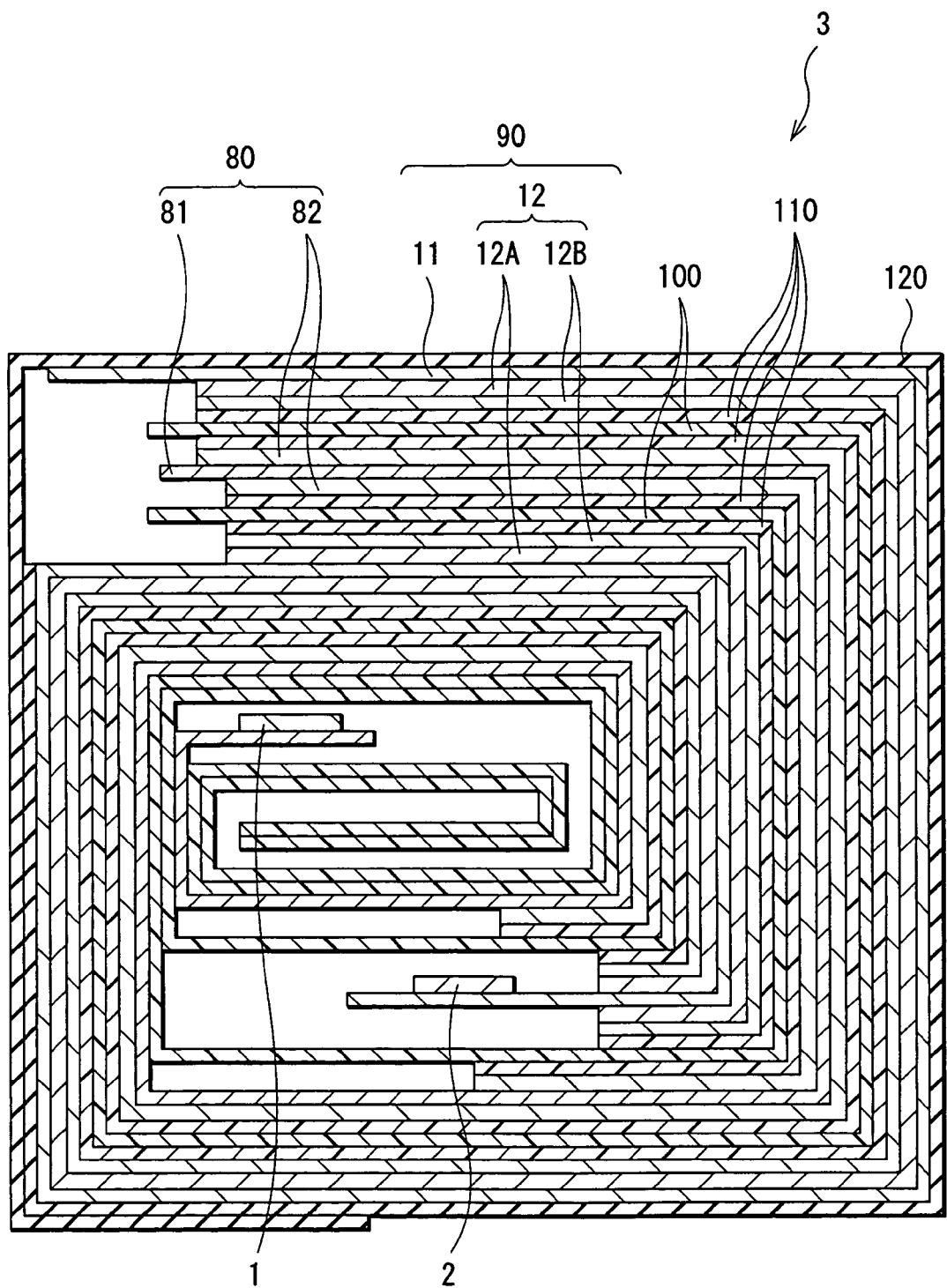
FIG. 6 is a cross sectional view showing a construction taken along line VI-VI of an electrode winding body shown in FIG. 5.

FIG. 6 is a view showing a cross sectional structure taken along line VI-VI of the electrode winding body 3 shown in FIG. 5. In the electrode winding body 3, a cathode 80 and an anode 90 according to this embodiment are layered and wound with a separator 100 and electrolyte layer 110 in between, and an outermost part is protected by a protective tape 120. In FIG. 6, the anode shown in FIG. 1 is shown as an example of the anode 90.

The cathode 80 has a structure wherein cathode active material layer 82 is provided on a single side or both sides of a cathode current collector 81. The anode 90 also has a structure wherein the anode active material layer 12 is provided on a single side or both sides of the anode current collector 11. Constructions of the cathode current collector 81, the cathode active material layer 82, and the separator 100 are similar to those of the foregoing cathode current collector 31, the cathode active material layer 32, and the separator 60.

The electrolyte layer 110 is made of a so-called gelatinous electrolyte, wherein an electrolytic solution is held in a holding body. The gelatinous electrolyte is preferable since the gelatinous electrolyte can provide a high ion conductivity and can prevent liquid leakage of the battery or expansion at high temperatures. A construction of the electrolytic solution (that is, a solvent and an electrolyte salt) is similar to that of the coin type secondary battery shown in FIG. 4.

The holding body is made of, for example, a high molecular weight compound. Examples of the high molecular weight compound include polyvinylidene fluoride, the block copolymer.

This secondary battery can be manufactured as follows, for example.

First, the electrolyte layers 110 wherein the electrolytic solution is held in the holding body are formed on the cathode 80 and the anode 90, respectively. After that, the cathode lead 1 is attached to an end of the cathode current collector 81 by welding or the like and the anode lead 2 is attached to an end of the anode current collector 11 by welding or the like.

Next, after making a lamination by layering the cathode 80 and the anode 90 on which the electrolyte layers 110 are formed with the separator 100 in between, this lamination is wound in its longitudinal direction, the protective tape 120 is bonded to the outermost circumferential part to form the electrode winding body 3.

Finally, for example, the electrode winding body 3 is sandwiched between the exterior members 4A and 4B, and the electrode winding body 3 is enclosed by adhering outer edges of the exterior members 4A and 4B by thermal fusion bonding or the like. Then, the adhesive films 5 are inserted between the cathode lead 1, the anode lead 2 and the exterior members 4A, 4B. Consequently, the secondary battery shown in FIG. 5 is completed.

This secondary battery acts similar to the coin type secondary battery shown in FIG. 4 does.

As above, in this embodiment, the second layer 12B is provided in addition to the first layer 12A. Therefore, collapse of the shape of the anode active material layer 12 due to charge and discharge, and the side reaction with the electrolyte in accordance with it can be inhibited. Consequently, reduction in the battery capacity due to repeat of charge and discharge can be inhibited.

In particular, when the second layer 12B contains a metal element other than tin, which is capable of electrochemically inserting and extracting lithium, and which has a melting point lower than that of the anode current collector 11 by 600° C. or over; or a component element of the anode current collector 11 is diffused in both the first layer 12A and the second layer 12B; or the second layer 12B is formed so that it has a thickness from 1% to 120% in relation to a thickness of the first layer 12A, and then heat treatment is provided, characteristics can be further improved.

EXAMPLES

Further, detailed descriptions will be given of concrete examples of the invention.

Examples 1-1 to 1-7

The anodes shown in FIG. 1 were formed. First, a copper foil having a surface roughness (arithmetic average roughness Ra) of 0.3 μm and a thickness of 15 μm was used for the anode current collector 11, and the first layer 12A made of tin having a thickness of 2 μm was formed on the surface of this anode current collector 11 by resistance heating vacuum deposition method. After that, the second layer 12B made of zinc was formed on the surface of the first layer 12A by resistance heating vacuum deposition method. A thickness of the second layer 12B is shown in Examples 1-1 to 1-7 in Table 1. Next, heat treatment was provided for five hours at 200° C. in vacuum atmosphere to obtain the anodes of Examples 1-1 to 1-7.

having an average grain diameter of 5 μm, carbon black, and polyvinylidene fluoride at a mass ratio of 92:3:5; throwing the mixture in N-methyl pyrrolidone to obtain slurry; applying the slurry on the cathode current collector 31 made of an aluminum foil having a thickness of 20 μm; drying the slurry; and pressing to form the cathode active material layer 32. An electrolytic solution in which $LiPF_6$ was dissolved in a solvent wherein 40 wt % of ethylene carbonate and 60 wt % of dimethyl carbonate were mixed so that the mol concentration of $LiPF_6$ became 1.0 mol/dm$^3$ was used. As the separator 60, a polypropylene fine porous film having a thickness of 25 μm was used.

Regarding the fabricated secondary batteries of Examples 1-1 to 1-7 and Comparative example 1-1, constant current and constant voltage charge was conducted on the condition of an upper limit voltage of 4.2 V and a current density of 1 mA/cm$^2$. After that, charge and discharge wherein constant current discharge was conducted on the condition of a current density of 1 mA/cm$^2$ and a final voltage of 2.5 V was repeated and the capacity retention ratio at 20th cycle was obtained on the condition that an initial discharge capacity is 100%. The results are shown in Table 1.

As evidenced by Table 1, according to Examples 1-1 to 1-7, higher capacity retention ratios could be obtained compared to Comparative example 1-1. That is, it was found that when the second layer 12B containing zinc was provided in addition to the first layer 12A, cycle characteristics could be improved.

Further, according to Examples 1-2 to 1-7, whose rates of the thickness of the second layer 12B in relation to the thickness of the first layer 12A were from 1% to 120%, still higher capacity retention ratios could be obtained compared to Example 1-1, whose rate of the thickness of the second layer

TABLE 1

|  | First layer | | Second layer | | Thickness of second layer/thickness of first layer | Capacity retention ratio |
| --- | --- | --- | --- | --- | --- | --- |
|  | Component element | Thickness | Component element | Thickness | | |
| Example 1-1 | Sn | 2 μm | Zn | 10 nm | 0.5% | 43% |
| Example 1-2 | Sn | 2 μm | Zn | 20 nm | 1.0% | 65% |
| Example 1-3 | Sn | 2 μm | Zn | 50 nm | 2.5% | 74% |
| Example 1-4 | Sn | 2 μm | Zn | 0.1 μm | 5.0% | 80% |
| Example 1-5 | Sn | 2 μm | Zn | 1 μm | 50% | 89% |
| Example 1-6 | Sn | 2 μm | Zn | 2 μm | 100% | 66% |
| Example 1-7 | Sn | 2 μm | Zn | 2.2 μm | 120% | 54% |
| Comparative example 1-1 | Sn | 2 μm | — | 0 | 0 | 41% |

As Comparative example 1-1 in relation to Examples 1-1 to 1-7, an anode was formed in a manner similar to in Examples 1-1 to 1-7 except that the second layer 12B was not formed. The formed anodes of Examples 1-1 to 1-7 were analyzed by XPS (X-ray Photoelectron Spectroscopy), AES (Auger Electron Spectroscopy), EDX (Energy Dispersive X-Ray Spectroscope), TEM (Transmission Electron Microscope), and XRD (X-Ray Diffraction). In result, it was confirmed that the component element of the anode current collector 11 was diffused in both the first layer 12A and the second layer 12B.

The coin type secondary batteries shown in FIG. 4 having a diameter of 20 mm and a thickness of 1.6 mm were fabricated by using the formed anodes of Examples 1-1 to 1-7 and Comparative example 1-1. In this regard, the cathode 30 was formed by mixing cobalt acid lithium ($LiCoO_2$) powders 12B in relation to the thickness of the first layer 12A was less than 1%. That is, it was found that when the second layer 12B was formed so that the rate of the thickness thereof was from 1% to 120% in relation to the thickness of the first layer 12A, cycle characteristics could be further improved.

Examples 2-1 and 2-2

As Example 2-1, the anode shown in FIG. 2 was formed. Specifically, first, the same anode current collector 11 as those of Examples 1-1 to 1-7 was used, and the second layer 12B made of zinc having a thickness of 1 μm was formed on the surface of the anode current collector 11. After that, the first layer 12A made of tin having a thickness of 2 μm was formed on the surface of the second layer 12B by resistance heating vacuum deposition method. Subsequent processes were conducted in a manner similar to in Examples 1-1 to 1-7. Further, as Example 2-2, the anode shown in FIG. 3 was formed. Specifically, first, the same anode current collector 11 as those of Examples 1-1 to 1-7 was used, and the first layer 12A made of tin having a thickness of 1 μm was formed on the surface of the anode current collector 11 by resistance heating vacuum deposition method. After that, the second layer 12B made of zinc having a thickness of 1 μm was formed on the surface of the first layer 12A by resistance heating vacuum deposition method. After that, the first layer 12A made of tin having a thickness of 1 μm was formed again on the surface of the second layer 12B by resistance heating vacuum deposition method. Subsequent processes were conducted in a manner similar to in Examples 1-1 to 1-7. The anodes of Examples 2-1 and 2-2 were analyzed by XPS, AES, EDX, TEM, and XRD as in Examples 1-1 to 1-7. In result, it was found that the component element of the anode current collector 11 was diffused in both the first layer 12A and the second layer 12B.

Further, secondary batteries were fabricated by using the formed anodes of Examples 2-1 and 2-2 in a manner similar to in Examples 1-1 to 1-7. Regarding the secondary batteries of Examples 2-1 and 2-2, their capacity retention ratios at 20th cycle were also obtained as in Examples 1-1 to 1-7. The obtained results are shown in Table 2 along with the results of Example 1-4 and Comparative example 1-1.

shown in Table 3, and secondary batteries were fabricated by using the anodes. The anodes of Examples 3-1 to 3-3 were also analyzed by XPS, AES, EDX, TEM, and XRD as in Examples 1-1 to 1-7. In result, it was confirmed that the component element of the anode current collector 11 was diffused in both the first layer 12A and the second layer 12B. In addition, regarding the secondary batteries of Examples 3-1 to 3-3, capacity retention ratios at 20th cycles were obtained as in Examples 1-1 to 1-7. The obtained results are shown in Table 3 along with the results of Example 1-4 and Comparative example 1-1. In Table 3, melting points of simple substances of the component elements of the second layer 12B are shown. The melting point of the anode current collector 11 was 1083.4° C., which is the melting point of copper.

TABLE 2

|  | First layer | | Second layer | | Thickness of second layer/thickness of first layer | Capacity retention ratio |
|  | Component element | Thickness (total) | Component element | Thickness | | |
|---|---|---|---|---|---|---|
| Example 1-4 | Sn | 2 μm | Zn | 1 μm | 50% | 89% |
| Example 2-1 | Sn | 2 μm | Zn | 1 μm | 50% | 86% |
| Example 2-2 | Sn | 2 μm | Zn | 1 μm | 50% | 91% |
| Comparative example 1-1 | Sn | 2 μm | — | 0 | 0 | 41% |

As evidenced by Table 2, according to Examples 2-1 and 2-2, like in Example 1-4, higher capacity retention ratios could be obtained compared to Comparative example 1-1.

TABLE 3

|  | First layer | | | Second layer | | | Thickness of second layer/thickness of first layer | Capacity retention ratio |
|  | Component element | Melting point | Thickness | Component element | Melting point | Thickness | | |
|---|---|---|---|---|---|---|---|---|
| Example 1-4 | Sn | 232.0° C. | 2 μm | Zn | 419.6° C. | 1 μm | 50% | 89% |
| Example 3-1 | Sn | 232.0° C. | 2 μm | Cd | 320.9° C. | 1 μm | 50% | 87% |
| Example 3-2 | Sn | 232.0° C. | 2 μm | In | 156.6° C. | 1 μm | 50% | 84% |
| Example 3-3 | Sn | 232.0° C. | 2 μm | Pb | 325.7° C. | 1 μm | 50% | 85% |
| Comparative example 1-1 | Sn | — | 2 μm | — | — | 0 | 0 | 41% |

That is, it was found that regardless of arrangement positions and layer number of the first layer 12A and the second layer 12B, when the second layer 12B was provided in addition to the first layer 12A, cycle characteristics could be improved.

Examples 3-1 to 3-3

Anodes were formed in a manner similar to in Example 1-4 except that the second layers 12B were made of elements As evidenced by Table 3, according to Examples 3-1 to 3-3, like in Example 1-4, higher capacity retention ratios could be obtained compared to Comparative example 1-1. That is, it was found that even when other elements were used as a metal element having a lower melting point than that of the anode current collector 11 by 600° C. or over, cycle characteristics could be improved.

Example 4-1

The same anode current collector 11 as of Example 1-4 was used, and the first layer 12A having a thickness of 2 μm was formed by depositing tin and cobalt on the anode current collector 11 by resistance heating vacuum deposition method. Subsequent processes were conducted in a manner similar to Example 1-4 to form the anode. In this regard, rates of atomicity of tin and cobalt in the first layer 12A were 90% for tin and 10% for cobalt.

The anode of Example 4-1 was also analyzed by XPS, AES, EDX, TEM, and XRD as in Examples 1-1 to 1-7. In result, it was confirmed that the component element of the anode current collector 11 was diffused in both the first layer 12A and the second layer 12B. As Comparative example 4-1 in relation to Example 4-1, an anode was formed in a manner similar to in Example 4-1 except that the second layer 12B was not formed.

Further, secondary batteries were fabricated by using the formed anodes of Example 4-1 and Comparative example 4-1 in a manner similar to in Examples 1-1 to 1-7. Regarding the secondary batteries of Example 4-1 and Comparative example 4-1, capacity retention ratios at 20th cycle were also obtained as in Examples 1-1 to 1-7. The obtained results are shown in Table 4.

As a solid electrolyte, for example, a high molecular weight solid electrolyte wherein an electrolyte salt is dispersed in a high molecular weight compound having ion conductivity, or an inorganic solid electrolyte comprised of ion conducting glass, ionic crystal or the like can be used. As a high molecular weight compound of the high molecular weight solid electrolyte, for example, an ether high molecular weight compound such as polyethylene oxide or a cross-linked polymer including polyethylene oxide, an ester high molecular weight compound such as polymethacrylate, and an acrylate high molecular weight compound can be used individually, by mixing them, or by copolymerization. As an inorganic solid electrolyte, lithium nitride, lithium phosphate or the like can be used.

Further, in the foregoing embodiment and Examples, the anode active material layer 12 is formed on the anode current collector 11. However, other layer can be formed between the anode current collector and the anode active material layer.

In addition, in the foregoing embodiment and Examples, the coin type and the winding laminated type secondary batteries have been described. However, the invention can be applied similarly to secondary batteries having other shape such as cylinder type, square type, button type, thin type, large type and multilayer laminated type secondary batteries. Further, the invention can be applied not only to the secondary batteries, but also to primary batteries.

Obviously many modifications and variations of the present invention are possible in the light of the above teach-

TABLE 4

|  | First layer | | Second layer | | Thickness of second layer/thickness of first layer | Capacity retention ratio |
| --- | --- | --- | --- | --- | --- | --- |
|  | Component element | Thickness | Component element | Thickness | | |
| Example 4-1 | Sn + Co | 2 μm | Zn | 1 μm | 50% | 92% |
| Comparative example 4-1 | Sn + Co | 2 μm | — | 0 | 0 | 47% |

As evidenced by Table 4, according to Example 4-1, a higher capacity retention ratio could be obtained compared to Comparative example 4-1. That is, it was found that when the first layer 12A contained an element incapable of electrochemically inserting and extracting lithium, cycle characteristics could be improved.

While the invention has been described with reference to the embodiment and Examples, the invention is not limited to the foregoing embodiment and Examples, and various modifications may be made. For example, in the foregoing embodiment and Examples, descriptions have been given of the case wherein concentrations of tin and elements other than tin in the anode active material layer 12 are intermittently changed in the thickness direction of the anode active material layer 12. However, these concentrations can be changed continuously. However, intermittent change is more preferable.

In the foregoing embodiment and Examples, descriptions have been given of the case using the electrolytic solution of the liquid electrolyte, or the so-called gelatinous electrolyte. However, other electrolyte can be used. As other electrolyte, a solid electrolyte having ion conductivity, a mixture of a solid electrolyte and an electrolytic solution, or a mixture of a solid electrolyte and a gelatinous electrolyte can be cited.

ings. It is therefore to be understood that within the scope of the appended claims the invention may be practiced otherwise than as specifically described.

What is claimed is:

1. An anode, comprising:
   an anode current collector; and
   an anode active material layer which is provided on the anode current collector and comprised of a first main layer formed on the anode current collector and a second main layer formed on the first main layer,
   wherein the anode active material layer contains tin (Sn) in the first main layer of the anode active material, and an element other than tin is a major component of the second main layer of the anode active material and which is capable of electrochemically inserting and extracting lithium (Li), and
   wherein said second main layer has a thickness of 2.5% - 50% relative to the thickness of the first main layer, and further wherein a concentration of tin and the element other than tin varies in the thickness direction throughout the respective layers.

2. The anode according to claim 1, wherein a component element of the anode current collector is diffused in both the first layer and the second layer.

3. The anode according to claim 1, wherein the second layer contains a metal element other than tin, which is capable of electrochemically inserting and extracting lithium, and which has a lower melting point than that of the anode current collector by 600° C. or over.

4. The anode according to claim 1, wherein the anode current collector contains at least one from the group consisting of copper (Cu), iron (Fe), nickel (Ni), and titanium (Ti), and the second layer contains at least one from the group consisting of zinc (Zn), cadmium (Cd), indium (In), and lead (Pb).

5. The anode according to claim 1, wherein a heat treatment is provided to the anode after formation of said second layer.

6. The anode of claim 1, wherein the major component of the second main layer of the anode active material is Zn.

7. The anode of claim 6, wherein said first layer additionally contains cobalt as an element incapable of electrochemically inserting and extracting lithium.

8. The anode of claim 1, wherein said first layer additionally contains an element incapable of electrochemically inserting and extracting lithium.

9. A battery comprising:
a cathode;
an anode; and
an electrolyte,
wherein the anode comprises an anode current collector and a multi-layer anode active material layer which is provided on the anode current collector, the multi-layer anode active material comprised of a first main layer formed on the anode current collector and a second main layer formed on the first main layer, and
wherein the first main layer contains tin (Sn) as a major component and the second main layer contains an element other than tin as a major component, the element other than tin being capable of electrochemically inserting and extracting lithium (Li), and
wherein said second main layer has a thickness of 2.5% -50% relative to the thickness of the first main layer, and further wherein a concentration of tin and the element other than tin varies in the thickness direction throughout the respective layers.

10. The battery according to claim 9, wherein a component element of the anode current collector is diffused in both the first layer and the second layer.

11. The battery according to claim 9, wherein the second layer contains a metal element other than tin, which is capable of electrochemically inserting and extracting lithium, and which has a lower melting point than that of the anode current collector by 600° C. or over.

12. The battery according to claim 9, wherein the anode current collector contains at least one from the group consisting of copper (Cu), iron (Fe), nickel (Ni), and titanium (Ti), and the second layer contains at least one from the group consisting of zinc (Zn), cadmium (Cd), indium (In), and lead (Pb).

13. The battery according to claim 9, wherein a heat treatment is provided to the anode after formation of said second layer.

14. The battery of claim 9, wherein the major component of the second main layer of the anode active material is Zn.

15. The battery of claim 14, wherein said first layer additionally contains cobalt as an element incapable of electrochemically inserting and extracting lithium.

16. The battery of claim 9, wherein said first layer additionally contains an element incapable of electrochemically inserting and extracting lithium.

17. An anode, comprising:
an anode current collector; and
an anode active material layer which is provided on the anode current collector and comprised of a first main layer formed on the anode current collector, a second main layer formed on the first main layer, and a third main layer formed on the second layer,
wherein the anode active material layer contains tin (Sn) in the first and third main layers of the anode active material, and an element other than tin is a major component of the second main layer of the anode active material and which is capable of electrochemically inserting and extracting lithium (Li).

18. The anode of claim 17, wherein the anode current collector contains at least one from the group consisting of copper (Cu), iron (Fe), nickel (Ni), and titanium (Ti), and the second layer contains at least one from the group consisting of zinc (Zn), cadmium (Cd), indium (In), and lead (Pb).

19. The anode of claim 17, wherein the major component of the second main layer of the anode active material is Zn.

20. The anode of claim 19, wherein said first layer additionally contains an element incapable of electrochemically inserting and extracting lithium.

21. The anode of claim 19, wherein said first layer additionally contains cobalt as an element incapable of electrochemically inserting and extracting lithium.

* * * * *